US 6,683,667 B2

(12) United States Patent
Jin et al.

(10) Patent No.: US 6,683,667 B2
(45) Date of Patent: Jan. 27, 2004

(54) TFT-LCD WITH SCATTERING LAYER, REFLECTOR, COLOR FILTERS FORMED ON TFT

(75) Inventors: Hyun-Suk Jin, Busan (KR); Won-Seok Kang, Seoul (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/254,834

(22) Filed: Sep. 26, 2002

(65) Prior Publication Data

US 2003/0122980 A1 Jul. 3, 2003

(30) Foreign Application Priority Data

Dec. 28, 2001 (KR) .................................. 10-2001-87595

(51) Int. Cl.[7] .......................... G02F 1/1335; G02F 1/136
(52) U.S. Cl. ........................... 349/113; 349/64; 349/43; 349/106; 349/44
(58) Field of Search ................................. 349/106, 113, 349/43, 187, 114, 112, 64, 110, 44

(56) References Cited

U.S. PATENT DOCUMENTS

| 4,648,691 A | * | 3/1987 | Oguchi et al. | 349/162 |
| 4,904,060 A | * | 2/1990 | Grupp | 349/162 |
| 5,548,425 A | * | 8/1996 | Adachi et al. | 349/112 |
| 5,724,111 A | * | 3/1998 | Mizobata et al. | 349/112 |

* cited by examiner

Primary Examiner—Toan Ton
(74) Attorney, Agent, or Firm—McKenna Long & Aldridge LLP

(57) ABSTRACT

A reflective liquid crystal display device includes first and second substrates facing and spaced apart from each other. A thin film transistor is connected to a gate line and a data line that define a pixel region, the thin film transistor having a gate electrode, an active layer, and source and drain electrodes. A passivation layer covers the gate line, the data line and the thin film transistor. A reflective plate of an opaque material is formed on the passivation layer at the pixel region. A scattering layer is formed on the reflective plate, the scattering layer having a contact hole exposing the drain electrode through the passivation layer. A pixel electrode of a transparent conductive material is formed on the scattering layer at the pixel region, the pixel electrode being connected to the drain electrode through the contact hole. A black matrix is formed on an inner surface of the second substrate, the black matrix covering an edge of the pixel electrode. A color filter layer is formed on the black matrix, the color filter layer having red, green and blue colors. A common electrode is formed on the color filter layer. A liquid crystal layer is interposed between the pixel electrode and the common electrode.

36 Claims, 13 Drawing Sheets

TFT-LCD WITH SCATTERING LAYER, REFLECTOR, COLOR FILTERS FORMED ON TFT

This application claims the benefit of Korean Patent Application No. 2001-87595, filed on Dec. 28, 2001, which is hereby incorporated by reference for all purposes as if fully set forth herein.

BACKGROUND OF THE INVENTION

1. Field of the Invention

The present invention relates to a liquid crystal display (LCD) device, and more particularly to a LCD device having a scattering layer and a fabricating method thereof.

2. Discussion of the Related Art

Flat panel display (FPD) devices having a small size, lightweight, and low power consumption have been a subject of recent research in the advent of the information age. FPD devices may be classified into two types depending on whether the device emits or receives light. One type is a light-emitting type display device that emits light to display images, and the other type is a light-receiving type display device that uses an external light source to display images. Plasma display panels (PDPs), field emission display (FED) devices, and electroluminescent (EL) devices are examples of the light-emitting type display devices. Liquid crystal display (LCD) devices are examples of the light-receiving type display device. Among many kinds of FPD devices, LCD devices are widely used for notebook computers and desktop monitors because of their excellent characteristics of resolution, color display and display quality.

Generally, LCD devices include an upper substrate and a lower substrate facing each other with liquid crystal molecules interposed therebetween. Each substrate has an electrode on the inner surface thereof. An electric field is generated by applying a voltage to the electrodes, thereby driving the liquid crystal molecules to display images in accordance with the light transmittance.

Since LCD devices do not emit light, an additional light source is necessary. Accordingly, LCD devices display images by disposing a backlight at a backside thereof and transmitting light from the backlight. Here, electric field-generating electrodes of LCD devices are usually made of a transparent conductive material and the two substrates are usually transparent. This kind of LCD device is referred to as a transmission type LCD device or a transmissive LCD device. Even though a transmissive LCD device can display bright images under a dark environment due to an artificial light source such as a backlight, the transmissive LCD device has a disadvantage of high power consumption due to the backlight.

To remedy this disadvantage, a reflective (or reflection type) LCD device is suggested. The reflective LCD device displays images by reflecting external natural or artificial light, thereby having a low power consumption compared with the transmissive LCD device. In the reflective LCD device, a lower electric field-generating electrode is made of a conductive material having high reflectance and an upper electric field-generating electrode is made of a transparent conductive material so that external light can be transmitted through the upper electric field-generating electrode.

FIG. 1 is a schematic cross-sectional view of a related art reflective LCD device. In FIG. 1, first and second substrates 11 and 21 are spaced apart from each other. A gate electrode 12 and a gate line (not shown) are formed on an inner surface of the first substrate 11 and a gate insulating layer 13 is formed on the gate electrode 12. An active layer 14, an ohmic contact layer 15a and 15b, and source and drain electrodes 16b and 16c are sequentially formed on the gate insulating layer 13 over the gate electrode 12 and constitutes a thin film transistor (TFT) "T" with the gate electrode 12. A data line 16a of the same material as the source and drain electrodes 16b and 16c is also formed on the gate insulating layer 13 and connected to the source electrode 16b. The data line 16a crosses the gate line (not shown), thereby defining a pixel region. Next, a passivation layer 17 of an organic material is formed on the data line 16a, and the source and drain electrodes 16b and 16c. The passivation layer 17 covers the TFT "T" and has a contact hole 17a exposing the drain electrode 16c. A pixel electrode 18 is formed on the passivation layer 17 at the pixel region and connected to the drain electrode 16c through the contact hole 17a. Here, the pixel electrode 18 of a conductive material such as metal covers the TFT "T" and overlaps the data line 16a to improve an aperture ratio. Further, the passivation layer 17 is made of an organic material having a low dielectric constant to prevent signal interference between the pixel electrode 18 and the data line 16a.

A black matrix 22 is formed on an inner surface of the second substrate 21. A color filter layer 23a, 23b and 23c having red, green and blue colors are formed on the black matrix 22. A common electrode 24 of a transparent conductive material is formed on the color filter layer 23a, 23b and 23c. Here, one color of the color filter layer 23a, 23b and 23c corresponds the pixel electrode 18 and the black matrix covers an edge of the pixel electrode 18. Since the pixel electrode 18 of an opaque material covers the TFT "T", the black matrix 22 can overlap only the edge of the pixel electrode 18.

A liquid crystal layer 30 is interposed between the pixel electrode 18 and the common electrode 24. Further, orientation films (not shown) that determine an initial alignment state of liquid crystal molecules are formed on the pixel electrode 18 and the common electrode 24, respectively.

As mentioned above, the reflective LCD device displays images by reflecting an incident light at the pixel electrode of a high reflective material. Therefore, the reflective LCD device can operate for a longer time without exchanging a battery because power consumption is reduced.

Since the related art reflective electrode has a flat surface, light is reflected as if the reflective electrode is a mirror. This phenomenon is referred to as a mirror reflection. Therefore, the brightness is higher only along any reflection direction depending on Snell's Law of Refraction. When incident light is reflected on a reflective display according to a position of a light source, the brightness is low along a normal direction of an LCD device. Another phenomenon that occurs is the light glare effect. This happens when a high-intensity external light source is reflected on a liquid crystal display panel. The displayed image is poor due to the glare that occurs as viewed by an observer due to the reflection of light. To increase the brightness along the normal direction and decrease the light glare effect on an LCD device, a reflective electrode of an uneven shape and a front scattering film are suggested.

FIG. 2 is a schematic cross-sectional view of a related art reflective LCD device using a front scattering film. In FIG. 2, a front scattering film 40 is disposed on an outer surface of a second substrate 21. However, an image blurring phenomenon due to back scattering at the front scattering film 40 degrades a display efficiency of the reflective LCD device.

FIG. 3 is a schematic cross-sectional view of a related art reflective LCD device using a reflective plate of an uneven shape. In FIG. 3, a surface of a pixel electrode 18 that is a reflective plate has an uneven shape by forming a passivation layer 17 that has an uneven surface. Accordingly, a brightness along a normal direction of the reflective LCD device increases by changing a reflection angle of light.

A slanting angle of the uneven shape may be about 10° so that light can be reflected along the normal direction of the reflective LCD device. However, a process of forming the uneven shape is a complicated process and has a low repeatability. The uneven shape of the passivation layer is initially formed to have a square shape. Subsequently, the passivation layer is cured to form a round shape. Uniform curing of the entire area of the passivation layer is difficult because it is dependent on the curing conditions. The curing temperature may range from about 100° C. to about 200° C. As a result, the uneven shape is not uniform throughout the entire area of the passivation layer. It is difficult to increase a brightness of a reflective LCD device even using a reflective electrode of an uneven shape due to a smaller effective scattering area of the light on the surface of the substrate. Moreover, since the pixel electrode is made of a metallic material and the common electrode is made of a transparent conductive material, a flicker occurs due to a work function difference between the pixel electrode and the common electrode.

SUMMARY OF THE INVENTION

Accordingly, the present invention is directed to a liquid crystal display device that substantially obviates one or more of problems due to limitations and disadvantages of the related art.

An advantage of the present invention is to provide a liquid crystal display device having a high brightness along a main viewing angle and a minimized flicker, and a fabricating method thereof.

Another advantage of the present invention is to provide a liquid crystal display device where brightness along a main viewing angle is high and a misalignment of the upper and lower substrates is prevented, and a fabricating method thereof.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device includes: first and second substrates facing and spaced apart from each other; a gate line and a data line on an inner surface of the first substrate, the gate line and the data line crossing each other and defining a pixel region; a thin film transistor connected to the gate line and the data line, the thin film transistor having a gate electrode, an active layer, and source and drain electrodes; a passivation layer covering the gate line, the data line and the thin film transistor; a reflective plate of an opaque material on the passivation layer at the pixel region; a scattering layer on the reflective plate, the scattering layer having a contact hole exposing the drain electrode through the passivation layer; a pixel electrode of a transparent conductive material on the scattering layer at the pixel region, the pixel electrode being connected to the drain electrode through the contact hole.

The liquid crystal display device further includes a black matrix on an inner surface of the second substrate, the black matrix covering an edge of the pixel electrode; a color filter layer on the black matrix, the color filter layer having red, green and blue colors; a common electrode on the color filter layer; and a liquid crystal layer interposed between the pixel electrode and the common electrode.

In another aspect of the present invention, a liquid crystal display device includes: first and second substrates facing and spaced apart from each other; a gate line and a data line on an inner surface of the first substrate, the gate line and the data line crossing each other and defining a pixel region; a thin film transistor connected to the gate line and the data line, the thin film transistor having a gate electrode, an active layer, and source and drain electrodes; a passivation layer covering the gate line, the data line and the thin film transistor; a reflective plate of an opaque material on the passivation layer at the pixel region; a scattering layer on the reflective plate; a color filter layer on the scattering layer, the color filter layer having red, green and blue colors, the color filter layer having a contact hole exposing the drain electrode through the passivation layer and the scattering layer; a pixel electrode of a transparent conductive material on the color filter layer at the pixel region, the pixel electrode being connected to the drain electrode through the contact hole.

The liquid crystal display device further includes a black matrix on the scattering layer, the black matrix overlapping the reflective plate; a common electrode on an inner surface of a second substrate; and a liquid crystal layer interposed between the pixel electrode and the common electrode.

In another aspect of the present invention, a fabricating method of a liquid crystal display device includes: forming a gate line and a data line on a first substrate, the gate line and the data line crossing each other and defining a pixel region; forming a thin film transistor connected to the gate line and the data line, the thin film transistor having a gate electrode, an active layer, and source and drain electrodes; forming a passivation layer covering the gate line, the data line and the thin film transistor; forming a reflective plate of an opaque material on the passivation layer at the pixel region; forming a scattering layer on the reflective plate, the scattering layer having a contact hole exposing the drain electrode through the passivation layer; forming a pixel electrode of a transparent conductive material on the scattering layer at the pixel region, the pixel electrode being connected to the drain electrode through the contact hole.

The fabricating method further includes forming a black matrix on a second substrate, the black matrix covering an edge of the pixel electrode; forming a color filter layer on the black matrix, the color filter layer having red, green and blue colors; forming a common electrode on the color filter layer; attaching the first and second substrates, the pixel electrode and the common electrode facing to each other; and injecting a liquid crystal material into a space between the pixel electrode and the common electrode.

In another aspect of the present invention, a fabricating method of a liquid crystal display device includes: forming a gate line and a data line on a first substrate, the gate line and the data line crossing each other and defining a pixel region; forming a thin film transistor connected to the gate line and the data line, the thin film transistor having a gate electrode, an active layer, and source and drain electrodes; forming a passivation layer covering the gate line, the data line and the thin film transistor; forming a reflective plate of an opaque material on the passivation layer at the pixel region; forming a scattering layer on the reflective plate;

forming a color filter layer on the scattering layer, the color filter layer having red, green and blue colors, the color filter layer having a contact hole exposing the drain electrode through the passivation layer and the scattering layer; forming a pixel electrode of a transparent conductive material on the color filter layer at the pixel region, the pixel electrode being connected to the drain electrode through the contact hole; forming a common electrode on a second substrate; attaching the first and second substrates, the pixel electrode and the common electrode facing to each other; and injecting a liquid crystal material into a space between the pixel electrode and the common electrode.

In another aspect of the present invention, a liquid crystal display device, comprises: first and second substrates facing and spaced apart from each other; a gate line and a data line on an inner surface of the first substrate, the gate line and the data line crossing each other and defining a pixel region; a thin film transistor connected to the gate line and the data line, the thin film transistor having a gate electrode, an active layer, and source and drain electrodes; a passivation layer covering the gate line, the data line and the thin film transistor; a reflective plate of an opaque material on the passivation layer at the pixel region, the reflective plate having a transmissive portion; a scattering layer on the reflective plate, the scattering layer having a contact hole exposing the drain electrode through the passivation layer; and a pixel electrode of a transparent conductive material on the scattering layer and the passivation layer at the pixel region, the pixel electrode being connected to the drain electrode through the contact hole.

The liquid crystal display device further comprises a transmissive portion which includes a hole wherein a portion of the pixel electrode is formed in the hole below the reflective plate. The transmissive portion is formed by etching a portion of the passivation layer and the scattering layer corresponding to the transmissive portion.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principle of the invention.

In the drawings.

DETAILED DESCRIPTION OF THE ILLUSTRATED EMBODIMENTS

Reference will now be made in detail to embodiments of the present invention, example of which are illustrated in the accompanying drawings. Wherever possible, similar reference numbers will be used throughout the drawings to refer to the same or like parts.

Figure 1:
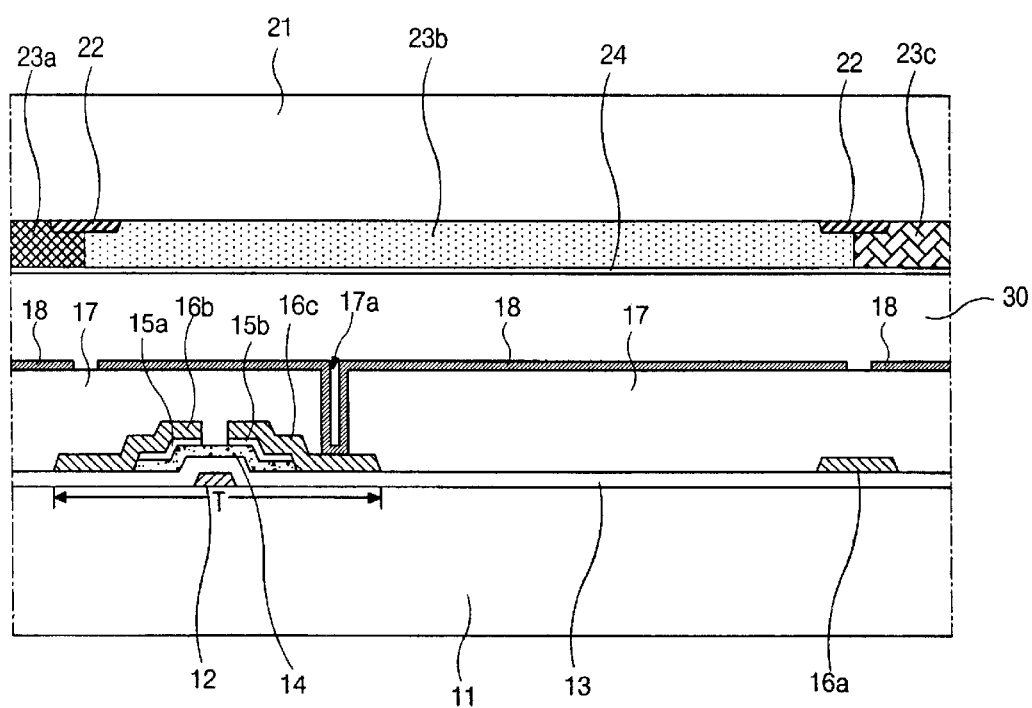
FIG. 1 is a schematic cross-sectional view of a related art reflective LCD device.
Figure 2:
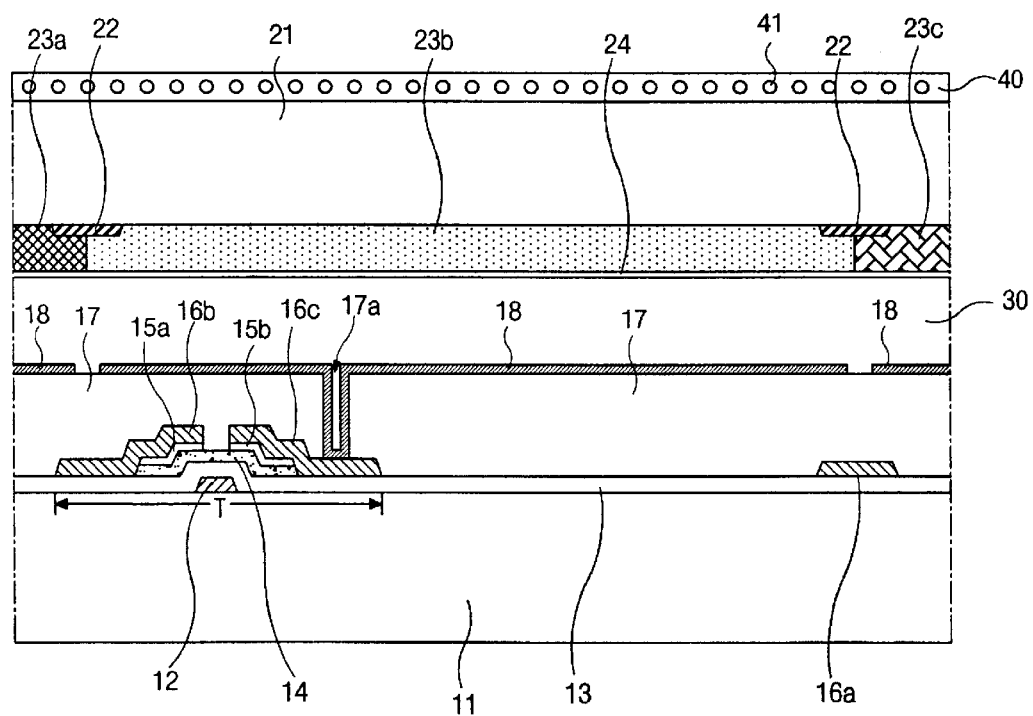
FIG. 2 is a schematic cross-sectional view of a related art reflective LCD device using a front scattering film.
Figure 3:
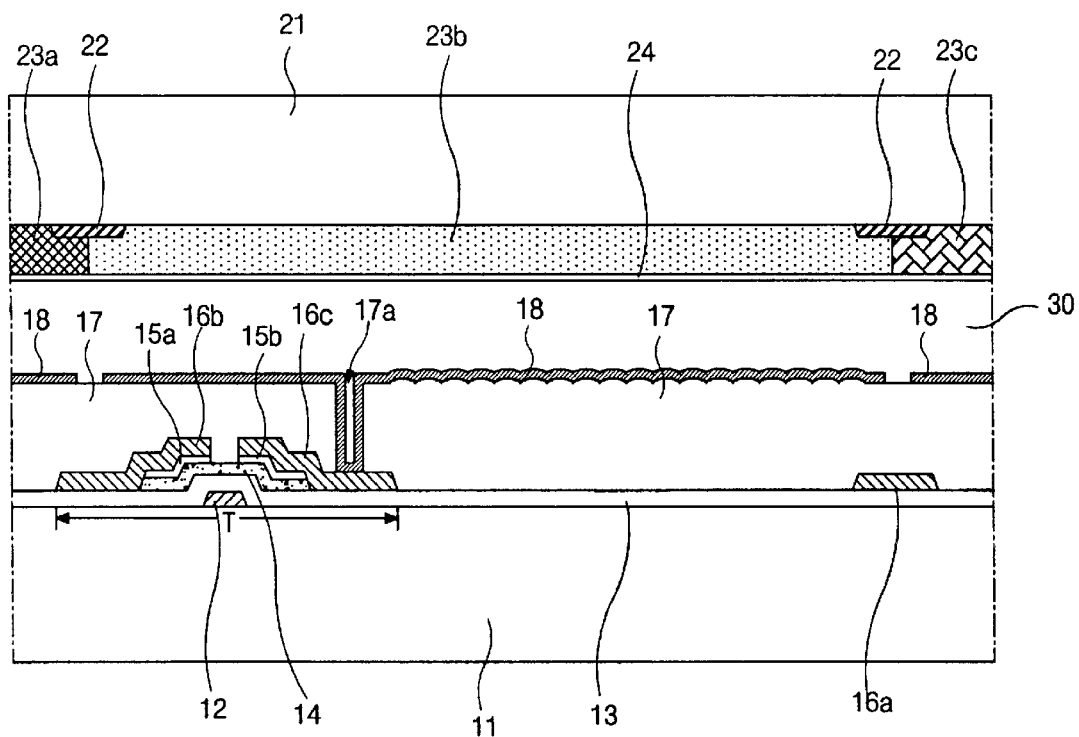
FIG. 3 is a schematic cross-sectional view of a related art reflective LCD device using a reflective plate of an uneven shape.
Figure 4:
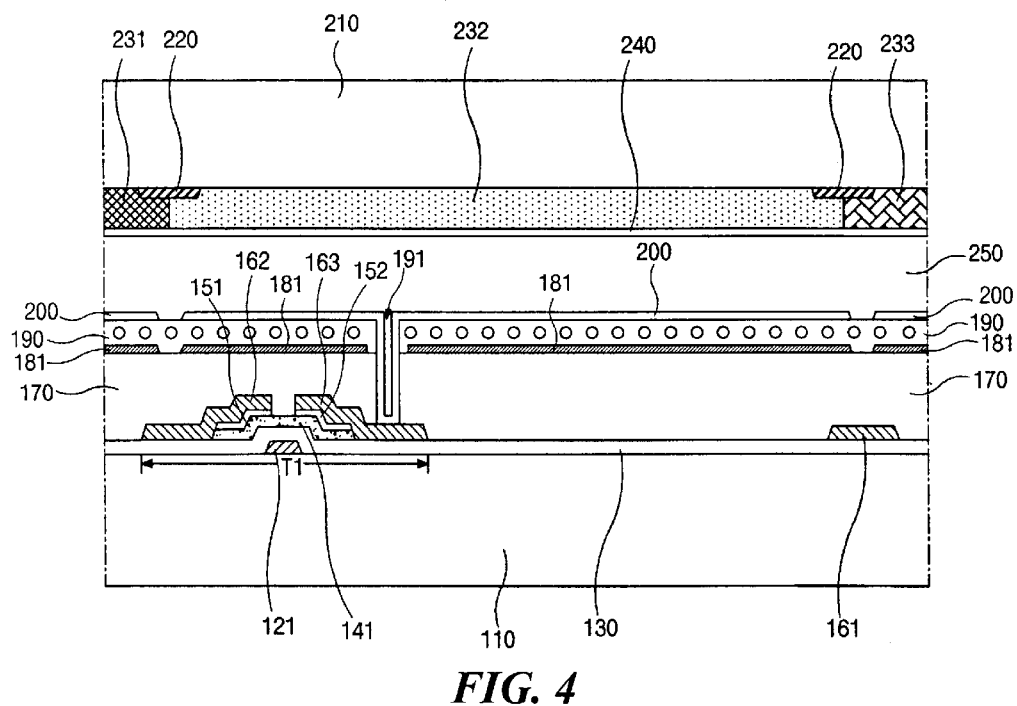
FIG. 4 is a schematic cross-sectional view of a reflective LCD device according to a first embodiment of the present invention.

FIG. 4 is a schematic cross-sectional view of a reflective LCD device according to a first embodiment of the present invention.

In FIG. 4, first and second substrates 110 and 210 are spaced apart from each other. A gate electrode 121 is formed on an inner surface of the first substrate 110 and a gate insulating layer 130 of silicon nitride (SiNx) or silicon oxide (SiO$_2$) is formed on the gate electrode 121. A gate line (not shown) connected to the gate electrode 121 is also formed on the inner surface of the first substrate 110. Next, an active layer 141 of amorphous silicon is formed on the gate insulating layer 130 over the gate electrode 121 and an ohmic contact layer 151 and 152 of impurity-doped amorphous silicon is formed on the active layer 141. A data line 161, and source and drain electrodes 162 and 163 of a conductive material such as metal are formed on the ohmic contact layer 151 and 152. The data line 161 connected to the source electrode 162 crosses the gate line to define a pixel region (not shown). The gate electrode 121, the active layer 141, and the source and drain electrodes 162 and 163 constitute a thin film transistor (TFT) "T1." Next, a passivation layer 170 is formed on the data line 161, and the source and drain electrodes 162 and 163. The passivation layer 170 includes an organic material having a low dielectric constant. Next, a reflective plate 181 of an opaque material such as metal is formed on the passivation layer 170. The reflective plate 181 covers the TFT "T1" and overlaps the data line 161 so that an aperture ratio can be improved. Next, a scattering layer 190 is formed on the reflective plate 181. The scattering layer 190 of polymer has a contact hole 191 exposing the drain electrode 163 through the passivation layer 170. Next, a pixel electrode 200 of a transparent conductive material is formed on the scattering layer 190. The pixel electrode 200 is connected to the drain electrode 163 through the contact hole 191 and separated from the reflective plate 181.

Next, a black matrix 220 is formed on an inner surface of the second substrate 210. The black matrix 220 covering an edge of the pixel electrode 200 prevents light leakage at the outside of the pixel region. Generally, the black matrix 220 covers the TFT "T1" to prevent a photocurrent generation of the TFT "T1." Since the reflective plate 181 of an opaque material covers the TFT "T1" and prevents light from entering a channel of the TFT "T1" in the present invention, the black matrix 220 may not be formed over the TFT "T1." Next, a color filter layer 231, 232 and 233 having red, green and blue colors is formed on the black matrix 220. One color of the color filter layer 231, 232 and 233 corresponds to one pixel region. Next, a common electrode 240 of a transparent conductive material is formed on the color filter layer 231, 232 and 233. The common electrode 240 has substantially the same material as the pixel electrode 200. The common electrode 240 and the pixel electrode 200 may have one of indium-tin-oxide (ITO) and indium-zinc-oxide (IZO). The black matrix 220 can be omitted.

Next, a liquid crystal layer 250 is interposed between the pixel electrode 200 and the common electrode 240. Liquid crystal molecules of the liquid crystal layer 250 are aligned according to an electric field generated between the pixel electrode 200 and the common electrode 240 when a voltage is applied to the pixel electrode 200 and the common electrode 240. Orientation films (not shown) determining an initial alignment state of the liquid crystal molecules are formed on the pixel electrode 200 and the common electrode 240, respectively.

In the present invention, since the scattering layer 190 on the reflective plate 181 scatters reflected light, brightness along a normal direction of the reflective LCD device increases. Moreover, since the pixel electrode 200 on the scattering layer 190 has the same material as the common electrode 240, there is no work function difference between the pixel electrode 200 and the common electrode 240. As a result, a flicker is prevented and image blurring is minimized.

FIGS. 5A to 5F are schematic cross-sectional views showing a fabricating process of a first substrate for a reflective LCD device according to the first embodiment of the present invention.

Figure 5A:
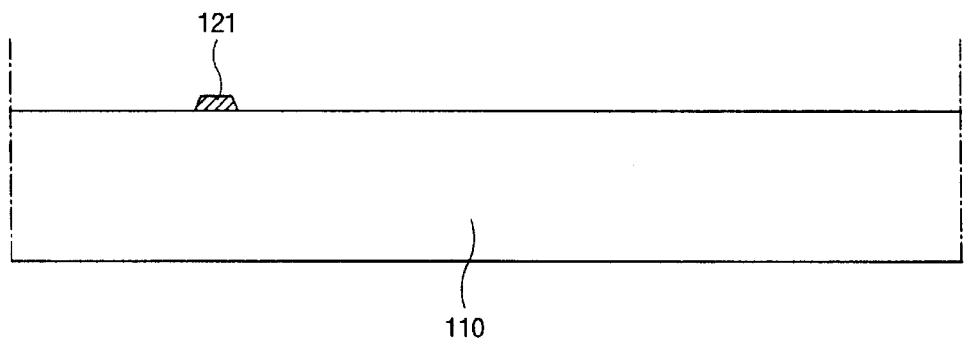
FIGS. 5A to 5F are schematic cross-sectional views showing a fabricating process of a first substrate for a reflective LCD device according to the first embodiment of the present invention.

In FIG. 5A, a gate electrode 121 is formed on a first substrate 110 through depositing and patterning a conductive material such as metal. Here, a gate line (not shown) connected to the gate electrode 121 is simultaneously formed on the first substrate 110. The gate electrode 121 and the gate line is made of a material having a low resistivity to prevent a signal delay.

Figure 5B:
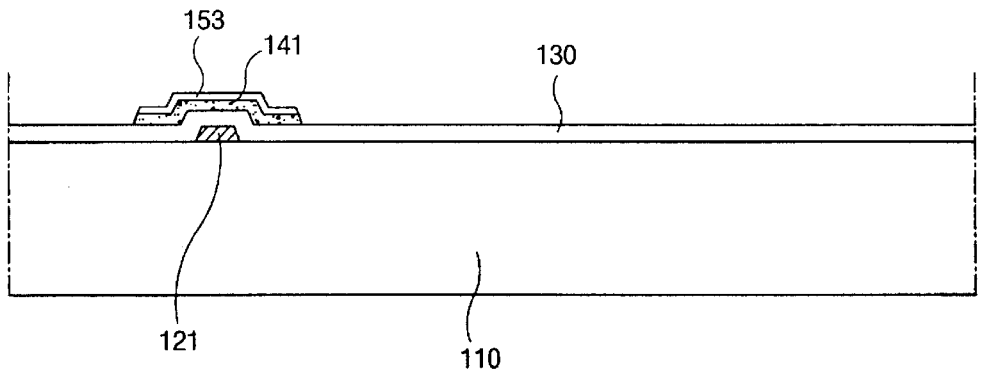

In FIG. 5B, a gate insulating layer 130 is formed on the gate electrode 121 through depositing one of silicon nitride (SiNx) and silicon oxide (SiO$_2$). An active layer 141 and an impurity-doped semiconductor layer 153 are sequentially formed on the gate insulating layer 130 over the gate electrode 121 through depositing and patterning amorphous silicon and impurity-doped amorphous silicon.

Figure 5C:
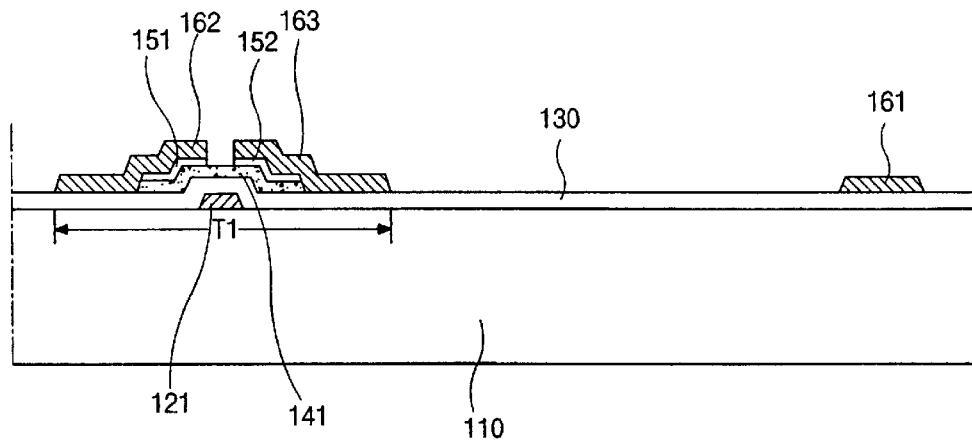

In FIG. 5C, a data line 161, and source and drain electrodes 162 and 163 are formed through depositing and patterning a conductive material such as metal. Subsequently, an ohmic contact layer 151 and 152 is completed through etching the impurity-doped semiconductor layer 153 (of FIG. 5B) exposed between the source and drain electrodes 162 and 163. Here, the data line 161 is connected to the source electrode 162 and defines a pixel region (not shown) by crossing the gate line (not shown). The source and drain electrodes 162 and 163 constitute a thin film transistor (TFT) "T1" with the gate electrode 121.

Figure 5D:
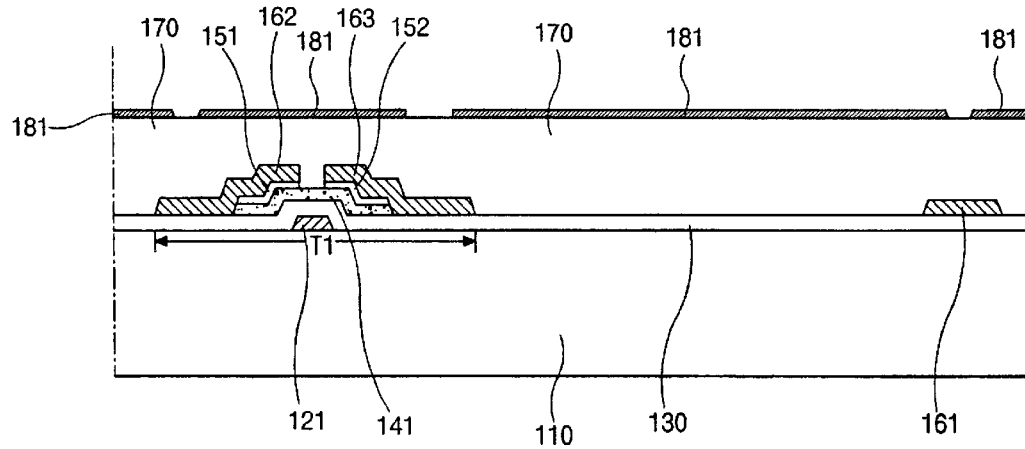

In FIG. 5D, after a passivation layer 170 is formed through depositing an organic material, a reflective plate 181 is formed at the pixel region through depositing and patterning an opaque material such as metal. Here, the passivation layer 170 is made of an organic material having a low dielectric constant, for example, benzocyclobutene (BCB) or acrylic resin. The reflective plate 181 overlaps the data line 161 and covers the TFT "T1." Further, the reflective plate 181 may be made of a material having a high reflectance such as aluminum (Al), aluminum-neodymium (AlNd), silver (Ag) or gold (Au). Here, a portion of the reflective plate 181 over the drain electrode 163 is also eliminated.

Figure 5E:
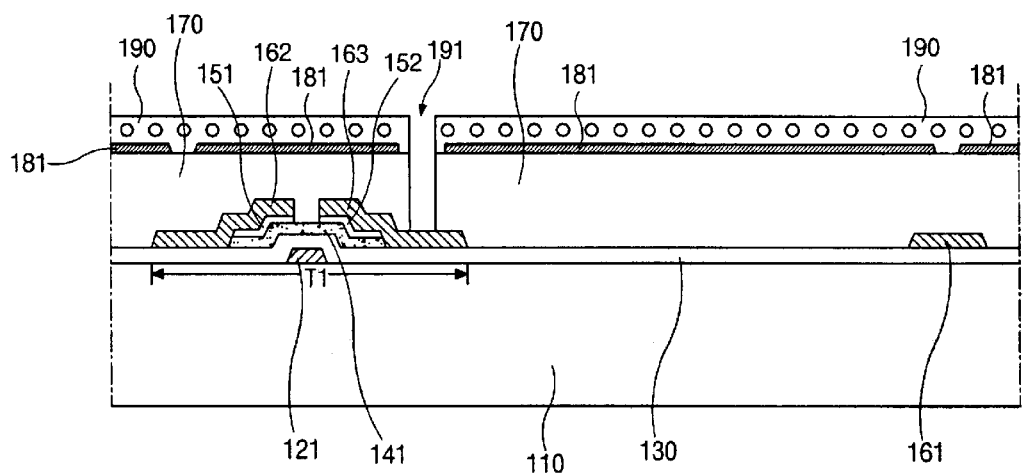

In FIG. 5E, a scattering layer 190 is formed on the reflective plate 181. The scattering layer 190 has a contact hole 191 exposing the drain electrode 163 through the passivation layer 170 by a method such as etching. The scattering layer 190 may be formed through spin-coating a polymer matrix where a spherical particle is dispersed and hardening the coated polymer matrix, or through coating a polymer matrix, dispersing a spherical particle into the coated polymer matrix by a spray, and hardening the coated polymer matrix where the spherical particle is dispersed. Here, the polymer matrix may have one of polyamide, polyimide and photoacrylic resin. As the number of spherical particles included in the polymer matrix increases, a scattering degree increases and the thickness of the scattering layer 190 increases. Therefore, it is preferable that a diameter of the spherical particle is within a range of about 1 to about 20 $\mu$m considering a thickness of the scattering layer 190 and a wavelength of incident light. Here, the scattering layer 190 may include the spherical particles of diverse sizes or one size. Even though the contact hole 191 is made through simultaneously patterning the scattering layer 190 and the passivation layer 170 in the present invention, the contact hole 191 may be completed through patterning the passivation layer 170 to make a first contact hole before forming the scattering layer 190 and patterning the scattering layer 190 to make a second contact hole corresponding to the first contact hole.

Figure 5F:
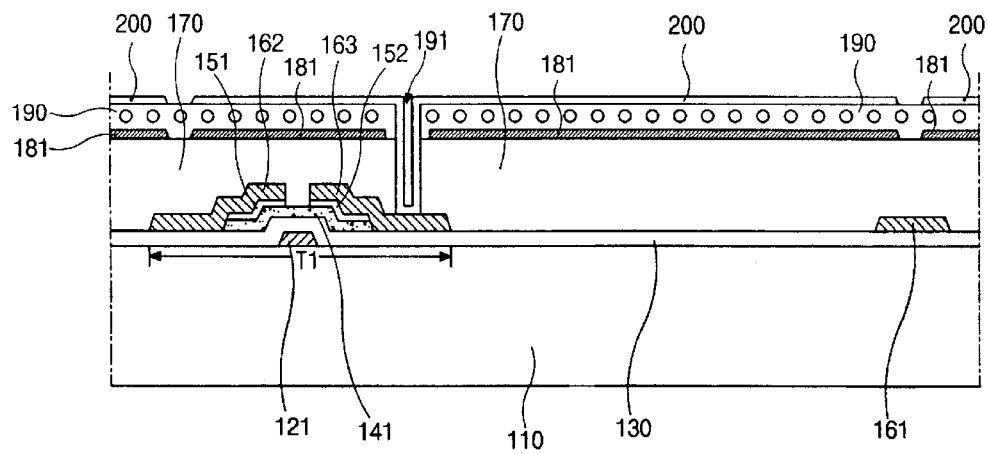

In FIG. 5F, a pixel electrode 200 is formed on the scattering layer 190 through depositing and patterning a transparent conductive material such as indium-tin-oxide (ITO) or indium-zinc-oxide (IZO). The pixel electrode 200 is connected to the drain electrode 163 through the contact hole 191 and separated from the reflective plate 181. The pixel electrode 200 may overlap the data line 161 and cover the TFT "T1."

Figure 6A:
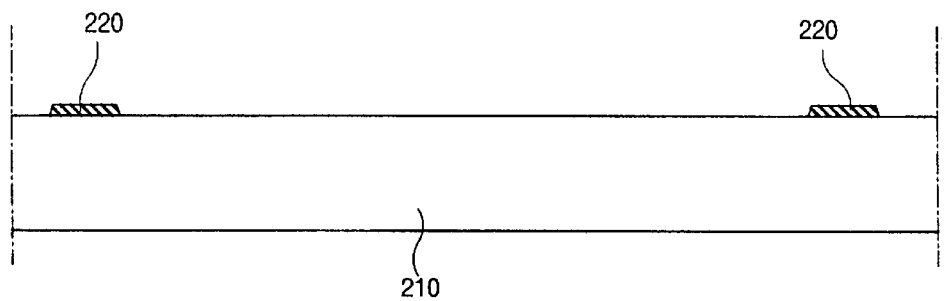
FIGS. 6A to 6C are schematic cross-sectional views showing a fabricating method of a second substrate for a reflective LCD device according to the first embodiment of the present invention.
Figure 6B:
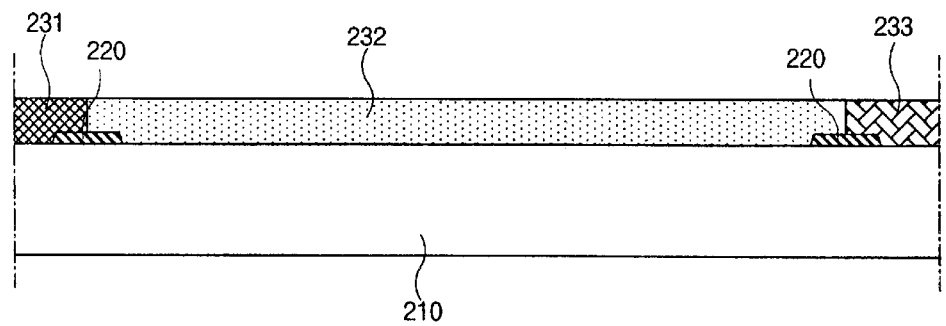
Figure 6C:
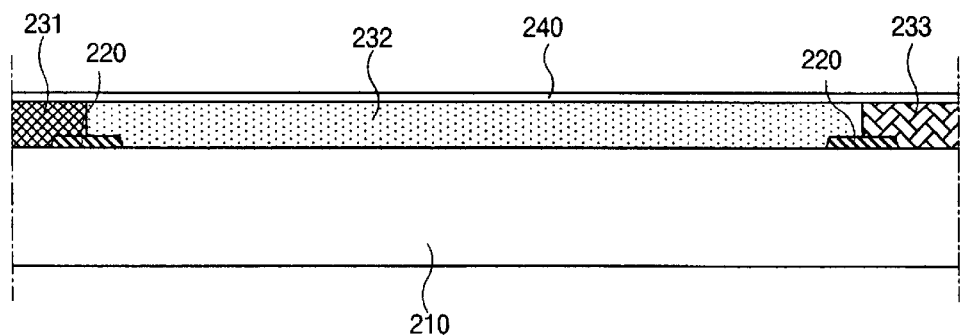

FIGS. 6A to 6C are schematic cross-sectional views showing a fabricating method of a second substrate for a reflective LCD device according to the first embodiment of the present invention.

In FIG. 6A, a black matrix 220 is formed on a second substrate 210 through depositing and patterning one of metal such as chromium (Cr) and black resin.

In FIG. 6B, a color filter layer 231, 232 and 233 having red, green and blue color is formed on the black matrix 220. One of a pigment dispersion method, a dyeing method and a printing method may be used for a formation of the color filter layer 231, 232 and 233.

In FIG. 6C, a common electrode 240 is formed on the color filter layer 231, 232 and 233 through depositing a transparent conductive material such as ITO or IZO. Here, an overcoat layer (not shown) of an organic material may be formed between the color filter layer 231, 232 and 233 and the common electrode 240.

A reflective LCD device shown in FIG. 4 is completed through attaching the first and second substrates 110 (of FIG. 5E) and 210 (of FIG. 6C) in such a way that the pixel electrode 200 (of FIG. 5E) and the common electrode 240 (of FIG. 6C) face to each other and injecting a liquid crystal material into a space between the pixel electrode 200 (of FIG. 5E) and the common electrode 240 (of FIG. 6C).

The reflective LCD device according to the first embodiment may have a disadvantage such as light leakage due to a misalignment during an attaching process. To prevent the disadvantage, a black matrix of an upper substrate may be formed to have a larger width. In this case, however, an aperture ratio decreases. Accordingly, a method of forming a black matrix and a color filter layer on a lower substrate is suggested to prevent the misalignment and increase the aperture ratio.

Figure 7:
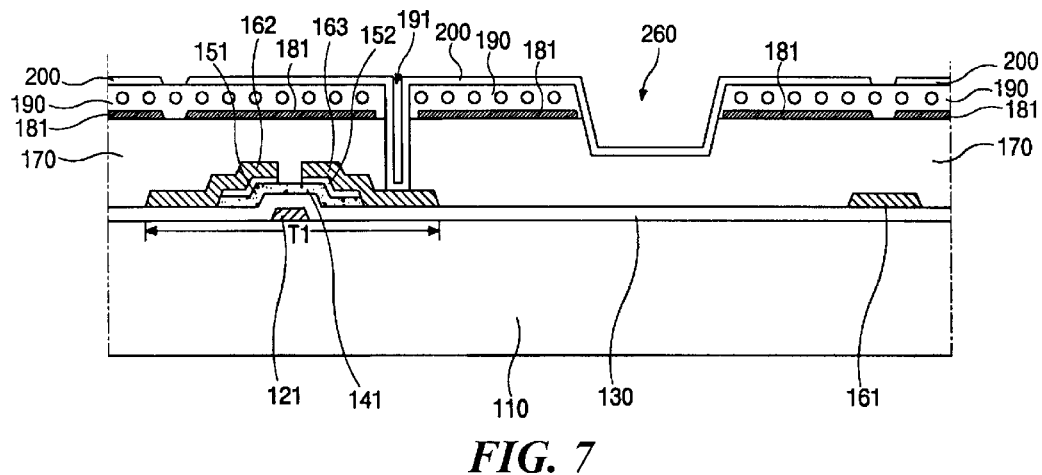
FIG. 7 is a schematic cross-sectional view of an array substrate for a transflective LCD device according to a second embodiment of the present invention.

A transflective liquid crystal display device using a scattering layer is possible as shown in FIG. 7.

FIG. 7 is a schematic cross-sectional view of an array substrate for a transflective LCD device according to a second embodiment of the present invention.

In FIG. 7, the reflective plate 181 and scattering layer 190 have a transmissive hole 260 formed therethrough. The scattering layer 190 is formed only on the reflective plate 181. A pixel electrode 200 of transparent conductive material is formed on the scattering layer 190 in a reflective part and on the passivation layer 170 in a transmissive part through the transmissive hole 260. The passivation layer 170 may be etched to a level below the reflective plate 181 to form the transmissive hole 260.

Figure 8:
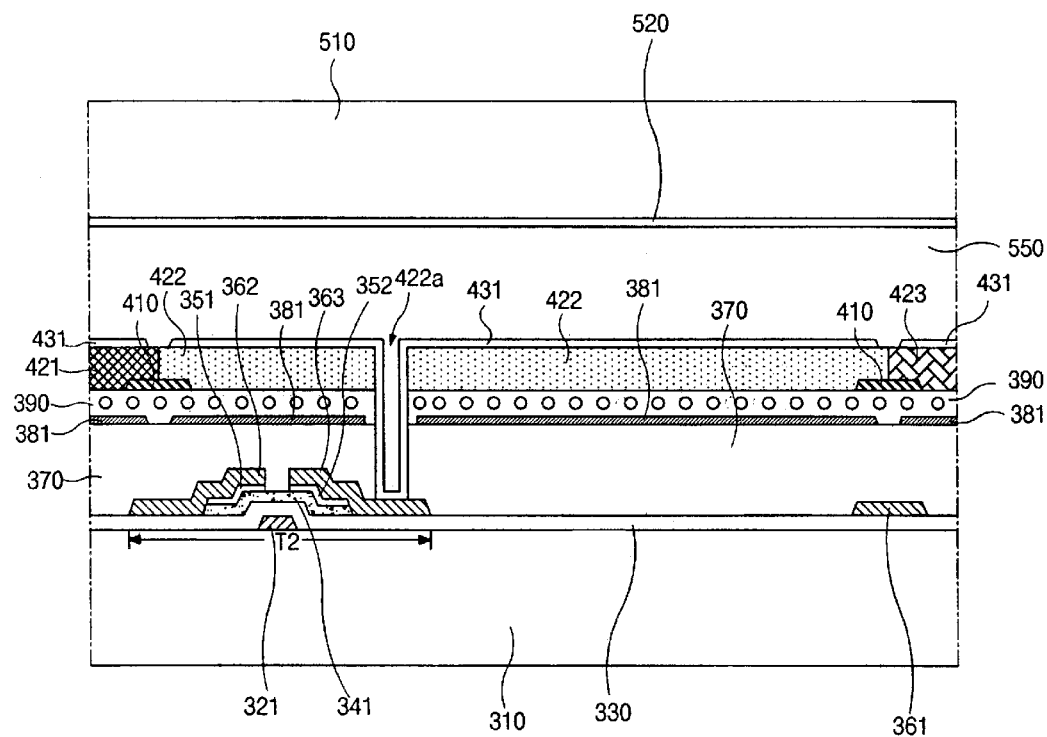
FIG. 8 is a schematic cross-sectional view of a reflective LCD device according to a third embodiment of the present invention.

FIG. 8 is a schematic cross-sectional view of a reflective LCD device according to a third embodiment of the present invention. In FIG. 8, first and second substrates 310 and 510 are spaced apart from each other. A gate electrode 321 is formed on an inner surface of the first substrate 310 and a gate insulating layer 330 of silicon nitride (SiNx) or silicon oxide (SiO$_2$) is formed on the gate electrode 321. A gate line (not shown) connected to the gate electrode 321 is also formed on the inner surface of the first substrate 310. Next, an active layer 341 of amorphous silicon is formed on the gate insulating layer 330 over the gate electrode 321 and an ohmic contact layer 351 and 352 of impurity-doped amorphous silicon is formed on the active layer 341. A data line 361, and source and drain electrodes 362 and 363 of a conductive material such as metal are formed on the ohmic contact layer 351 and 352. The data line 361 connected to the source electrode 362 crosses the gate line to define a pixel region (not shown). The gate electrode 321, the active layer 341, and the source and drain electrodes 362 and 363 constitute a thin film transistor (TFT) "T2." Next, a passivation layer 370 is formed on the data line 361, and the source and drain electrodes 362 and 363. Preferably, the passivation layer 370 includes an organic material having a low dielectric constant. Next, a reflective plate 381 of an opaque material such as metal is formed on the passivation layer 370. The reflective plate 381 covers the TFT "T2" and overlaps the data line 361 so that an aperture ratio can be improved. Next, a scattering layer 390 of polymer including a spherical particle is formed on the reflective plate 381 and a black matrix 400 is formed on the scattering layer 390. Next, a color filter layer 421, 422 and 423 having red, green and blue colors alternately is formed on the black matrix 400. One color of the color filter layer 421, 422 and 423 corresponds to one pixel region. The color filter layer 421, 422 and 423 has a contact hole 422a exposing the drain electrode 363 in common withthrough the passivation layer 370 and the scattering layer 390. Next, a pixel electrode 431 of a transparent conductive material is formed on the color filter layer 421, 422 and 423. The pixel electrode 431 is connected to the drain electrode 363 through the contact hole 422a and separated from the reflective plate 381.

A common electrode 520 of a transparent conductive material such as indium-tin-oxide (ITO) or indium-zinc-oxide (IZO) is formed on an inner surface of the second substrate 510.

A liquid crystal layer 550 is interposed between the pixel electrode 431 and the common electrode 520. Orientation films (not shown) are formed on the pixel electrode 431 and the common electrode 520, respectively.

FIGS. 9A to 9H are schematic cross-sectional views showing a fabricating process of a first substrate for a reflective LCD device according to the third embodiment of the present invention.

Figure 9A:
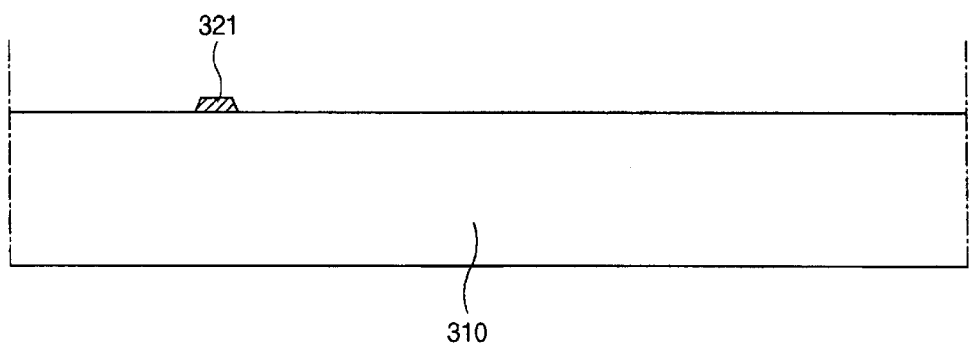
FIGS. 9A to 9H are schematic cross-sectional views showing a fabricating process of a first substrate for a reflective LCD device according to the third embodiment of the present invention.

In FIG. 9A, a gate electrode 321 is formed on an inner surface of the first substrate 310 through depositing and patterning a conductive material such as metal. The gate electrode 321 is made of a material having a low resistivity to prevent a signal delay.

Figure 9B:
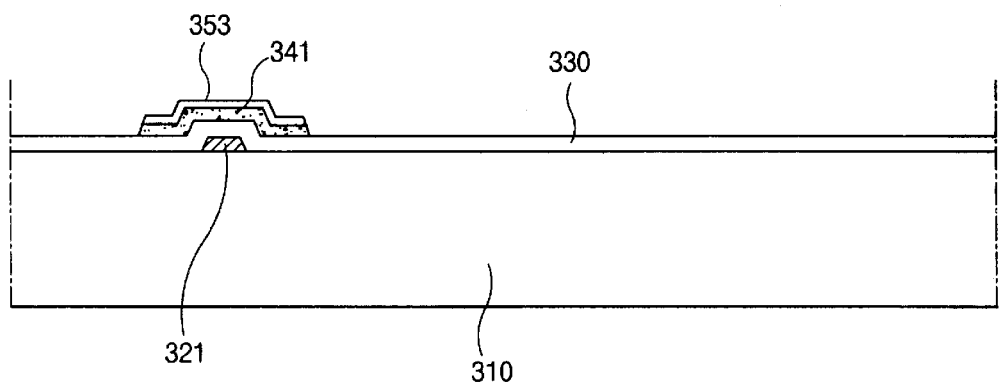

In FIG. 9B, a gate insulating layer 330 of silicon nitride (SiNx) or silicon oxide (SiO$_2$) is formed on the gate electrode 321. A gate line (not shown) connected to the gate electrode 321 is also formed on the inner surface of the first substrate 310. Next, an active layer 341 of amorphous silicon and an impurity-doped semiconductor layer 353 are sequentially formed on the gate insulating layer 330 over the gate electrode 321 through depositing and patterning amorphous silicon and impurity-doped amorphous silicon.

Figure 9C:
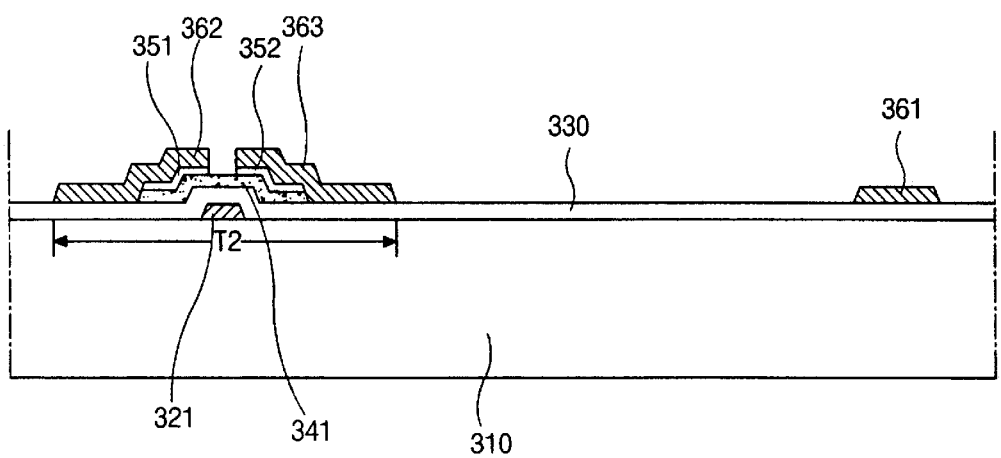

In FIG. 9C, a data line 361, and source and drain electrodes 362 and 363 of a conductive material such as metal are formed through depositing and patterning a conductive material such as metal. Subsequently, an ohmic contact layer 351 and 352 is completed through etching the impurity-doped semiconductor layer 353 (of FIG. 9B) exposed between the source and drain electrodes 362 and 363. Here, the data line 361 is connected to the source electrode 362 and crosses the gate line (not shown) to define a pixel region (not shown). The gate electrode 321, the active layer 341, and the source and drain electrodes 362 and 363 constitute a thin film transistor (TFT) "T2."

Figure 9D:
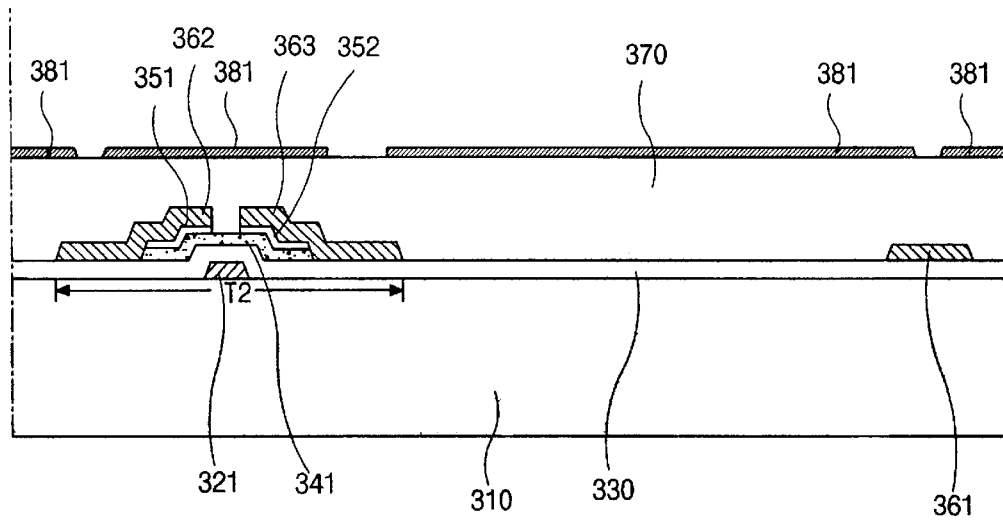

In FIG. 9D, a passivation layer 370 is formed on the data line 361 through depositing an organic material having a low dielectric constant. Next, a reflective plate 381 of an opaque material such as metal is formed on the passivation layer 370. The reflective plate 381 covers the TFT "T2" and overlaps the data line 361 so that an aperture ratio can be improved. Further, the reflective plate 381 may be made of a material having a high reflectance such as aluminum (Al), aluminum-neodymium (AlNd), silver (Ag) or gold (Au). Here, a portion of the reflective plate 381 over the drain electrode 363 is also removed.

Figure 9E:
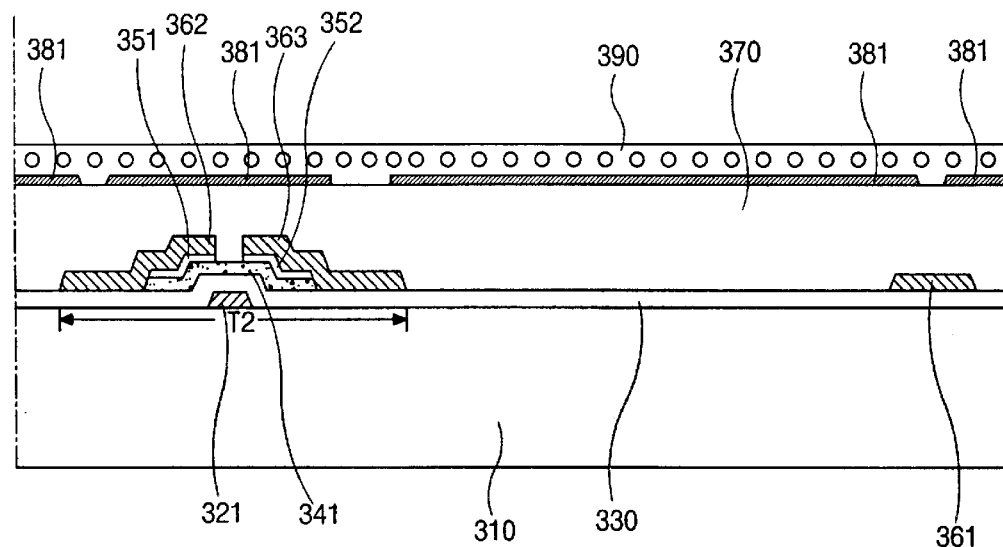

In FIG. 9E, a scattering layer 390 of polymer including a spherical particle is formed on the reflective plate 381. The scattering layer 390 may be formed through spin-coating a polymer matrix where a spherical particle is dispersed and hardening the coated polymer matrix, or through coating a polymer matrix, dispersing a spherical particle into the coated polymer matrix by a spray, and hardening the coated polymer matrix where the spherical particle is dispersed. Here, the polymer matrix may have one of polyamide, polyimide and photoacrylic resin. As the number of spherical particles included in the polymer matrix increases, a scattering degree increases and the thickness of the scattering layer 390 increases. As illustrated in the first embodiment, it is preferable that a diameter of the spherical particle is within a range of about 1 to about 20 $\mu$m considering a thickness of the scattering layer 390 and a wavelength of incident light. Here, the scattering layer 390 may include the spherical particles of diverse sizes or one size.

Figure 9F:
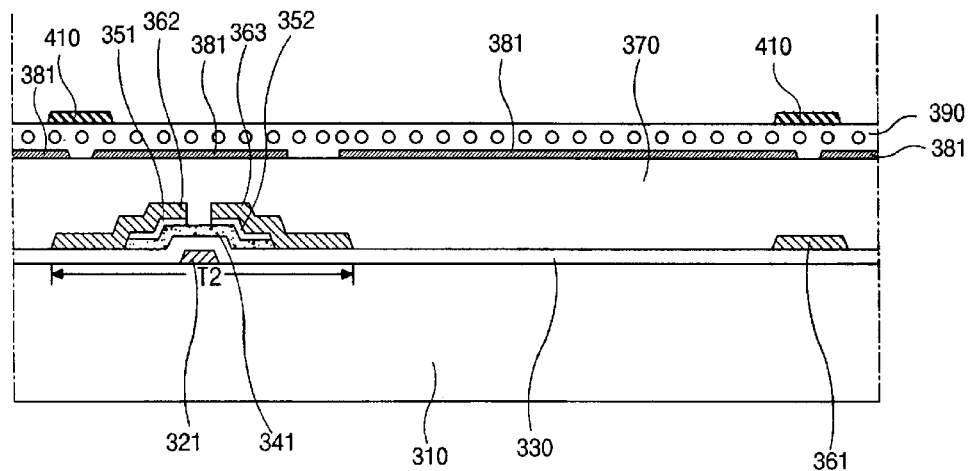
Figure 9G:
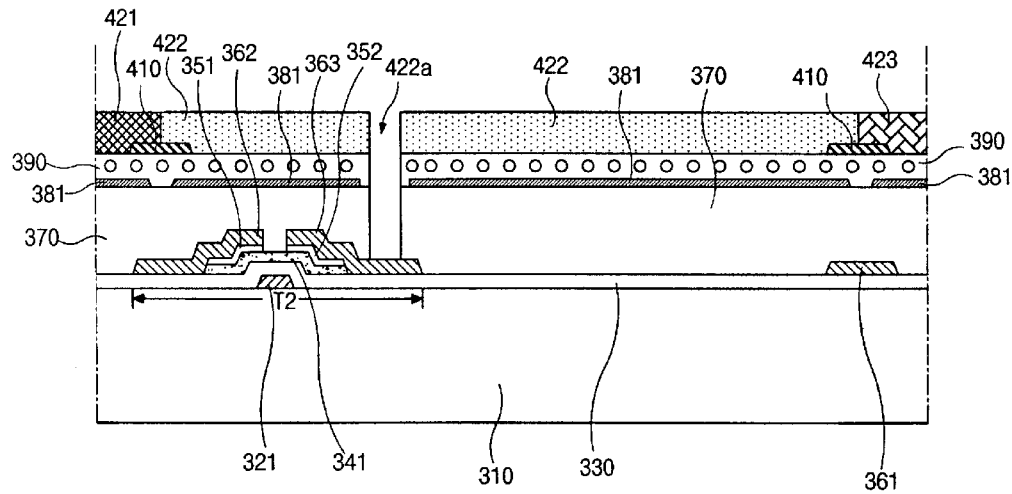

In FIG. 9F, a black matrix 410 is formed on the scattering layer 390 through depositing and patterning a metal such as chromium (Cr) or using black resin.

In FIG. 9C; a color filter layer 421, 422 and 423 having red, green and blue colors is formed on the black matrix 410. One color of the color filter layer 421, 422 and 423 corresponds to one pixel region. The color filter layer 421, 422 and 423 has a contact hole 422a exposing the drain electrode 363 through the passivation layer 370 and the scattering layer 390.

Figure 9H:
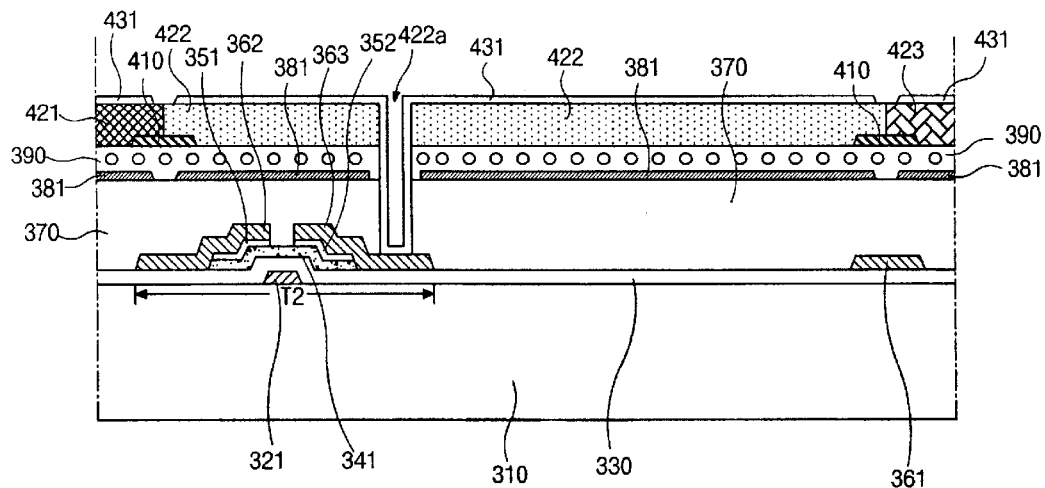

In FIG. 9H, a pixel electrode 431 of a transparent conductive material is formed on the color filter layer 421, 422 and 423 through depositing and patterning a transparent conductive material such as indium-tin-oxide (ITO) or indium-zinc-oxide (IZO). The pixel electrode 431 is connected to the drain electrode 363 through the contact hole 422a and separated from the reflective plate 381. The pixel electrode 431 may overlap the data line 361 and cover the TFT "T2."

After a common electrode 520 of a transparent conductive material such as indium-tin-oxide (ITO) or indium-zinc-oxide (IZO) is formed on an inner surface of the second substrate 510 (of FIG. 8), the first and second substrates 310 and 510 are spaced apart from each other and are attached in such a way that the pixel electrode 431 (of FIG. 9H) and the common electrode 520 (of FIG. 8) face to each other.

The reflective LCD device shown in FIG. 8 is completed through injecting a liquid crystal material 550 into a space between the pixel electrode 431 (of FIG. 9H) and the common electrode 520. Orientation films (not shown) are formed on the pixel electrode 431 and the common electrode 520, respectively.

Figure 10:
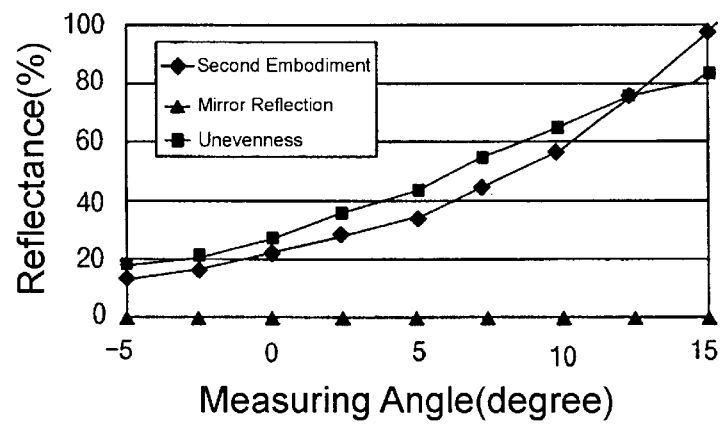
FIG. 10 is a graph showing a reflectance of reflective LCD devices using a reflective plate of a mirror reflection, a reflective plate of an uneven shape, and a scattering layer (the third embodiment).

FIG. 10 is a graph showing a reflectance of reflective LCD devices using a reflective plate of a mirror reflection, a reflective plate of an uneven shape, and a scattering layer (the second embodiment). The reflectance is normalized with respect to a reflectance using magnesium oxide (MgO) to measure the efficiency of the light intensity and incident light enters the reflective LCD device with an angle of 30° with respect to a normal direction of the reflective LCD device. The reflectance is measured at a viewing angle of −5 to 15°.

As shown in FIG. 9, for a reflective plate of a mirror reflection, since the incident light is reflected only with a reflected angle of 30°, reflected light is nearly not measured at the viewing angle of −5 to 15°. For the second embodiment, i.e., a color filter layer and a scattering layer on a reflective plate, reflected light increases in proportion to the rise in the viewing angle and the reflectance is similar to that of a reflective plate of an uneven shape.

Consequently, since a scattering layer is formed on a reflective plate and a pixel electrode of the same material as a common electrode is formed thereon, brightness increases at a range of main viewing angle and a flicker is prevented. Moreover, since a color filter layer is formed on the scattering layer, a misalignment of the upper and lower substrates is prevented without a reduction of reflectance.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   first and second substrates facing and spaced apart from each other;
   a gate line and a data line on an inner surface of the first substrate, the gate line and the data line crossing each other and defining a pixel region;
   a thin film transistor connected to the gate line and the data line, the thin film transistor having a gate electrode, an active layer, and source and drain electrodes;
   a passivation layer covering the gate line, the data line and the thin film transistor;
   a reflective plate of an opaque material on the passivation layer at the pixel region;
   a scattering layer on the reflective plate, the scattering layer having a contact hole exposing the drain electrode through the passivation layer; and
   a pixel electrode of a transparent conductive material on the scattering layer at the pixel region, the pixel electrode being connected to the drain electrode through the contact hole.

2. The device according to claim 1, further comprising:
   a color filter layer on an inner surface of the second substrate, the color filter layer having red, green and blue colors; and
   a common electrode on the color filter layer.

3. The device according to claim 2, further comprising:
   a black matrix on the inner surface of the second substrate, the black matrix covering an edge of the pixel electrode.

4. The device according to claim 2, wherein the pixel electrode and the common electrode include one of indium-tin-oxide and indium-zinc-oxide.

5. The device according to claim 1, wherein the scattering layer includes one of polyamide, polyimide and photoacrylic resin.

6. The device according to claim 5, wherein the scattering layer includes a spherical particle.

7. The device according to claim 6, wherein a diameter of the spherical particle is within a range of about 1 $\mu$m to about 20 $\mu$m.

8. The device according to claim 1, wherein the passivation layer includes an organic insulating material.

9. The device according to claim 8, wherein the organic insulating material is one of benzocyclobutene and acrylic resin.

10. The device according to claim 1, wherein the pixel electrode overlaps the data line.

11. The device according to claim 2, further comprising a liquid crystal layer interposed between the pixel electrode and the common electrode.

12. A liquid crystal display device, comprising:
   first and second substrates facing and spaced apart from each other;
   a gate line and a data line on an inner surface of the first substrate, the gate line and the data line crossing each other and defining a pixel region;
   a thin film transistor connected to the gate line and the data line, the thin film transistor having a gate electrode, an active layer, and source and drain electrodes;
   a passivation layer covering the gate line, the data line and the thin film transistor;
   a reflective plate of an opaque material on the passivation layer at the pixel region;
   a scattering layer on the reflective plate;
   a color filter layer on the scattering layer, the color filter layer having red, green and blue colors, the color filter layer having a contact hole exposing the drain electrode through the passivation layer and the scattering layer;
   a pixel electrode of a transparent conductive material on the color filter layer at the pixel region, the pixel electrode being connected to the drain electrode through the contact hole;

a common electrode on an inner surface of the second substrate; and a liquid crystal layer interposed between the pixel electrode and the common electrode.

13. The device according to claim 12, further comprising: a black matrix on the scattering layer, the black matrix overlapping the reflective plate.

14. The device according to claim 12, wherein the pixel electrode and the common electrode include one of indium-tin-oxide and indium-zinc-oxide.

15. The device according to claim 12, wherein the scattering layer includes one of polyamide, polyimide and photoacrylic resin.

16. The device according to claim 15, wherein the scattering layer includes a spherical particle.

17. The device according to claim 16, wherein a diameter of the spherical particle is within a range of about 1 $\mu$m to about 20 $\mu$m.

18. The device according to claim 12, wherein the passivation layer includes an organic insulating material.

19. The device according to claim 18, wherein the organic insulating material includes one of benzocyclobutene and acrylic resin.

20. The device according to claim 12, wherein the pixel electrode overlaps the data line.

21. A fabricating method of a liquid crystal display device, comprising:

forming a gate line and a data line on a first substrate, the gate line and the data line crossing each other and defining a pixel region;

forming a thin film transistor connected to the gate line and the data line, the thin film transistor having a gate electrode, an active layer, and source and drain electrodes;

forming a passivation layer covering the gate line, the data line and the thin film transistor;

forming a reflective plate of an opaque material on the passivation layer at the pixel region;

forming a scattering layer on the reflective plate, the scattering layer having a contact hole exposing the drain electrode through the passivation layer;

forming a pixel electrode of a transparent conductive material on the scattering layer at the pixel region, the pixel electrode being connected to the drain electrode through the contact hole.

22. The method according to claim 21, further comprising:

forming a color filter layer on a second substrate, the color filter layer having red, green and blue colors;

forming a common electrode on the color filter layer.

23. The method according to claim 22, further comprising:

forming a black matrix on the inner surface of the second substrate, the black matrix covering an edge of the pixel electrode.

24. The method according to claim 22, further comprising:

attaching the first and second substrates, the pixel electrode and the common electrode facing to each other; and injecting a liquid crystal material into a space between the pixel electrode and the common electrode.

25. The method according to claim 21, wherein the scattering layer includes a spherical particle.

26. The method according to claim 25, wherein forming the scattering layer comprises:

coating the polymer matrix including the spherical particle; and hardening the coated polymer matrix.

27. The method according to claim 25, wherein forming the scattering layer comprises:

coating the polymer matrix;

dispersing the spherical particle into the coated polymer matrix; and hardening the polymer matrix where the spherical particle is dispersed.

28. A fabricating method of a liquid crystal display device, comprising:

forming a gate line and a data line on a first substrate, the gate line and the data line crossing each other and defining a pixel region;

forming a thin film transistor connected to the gate line and the data line, the thin film transistor having a gate electrode, an active layer, and source and drain electrodes;

forming a passivation layer covering the gate line, the data line and the thin film transistor;

forming a reflective plate of an opaque material on the passivation layer at the pixel region;

forming a scattering layer on the reflective plate;

forming a color filter layer on the scattering layer, the color filter layer having red, green and blue colors, the color filter layer having a contact hole exposing the drain electrode through the passivation layer and the scattering layer;

forming a pixel electrode of a transparent conductive material on the color filter layer at the pixel region, the pixel electrode being connected to the drain electrode through the contact hole;

forming a common electrode on a second substrate;

attaching the first and second substrates, the pixel electrode and the common electrode facing each other; and injecting a liquid crystal material into a space between the pixel electrode and the common electrode.

29. The method according to claim 28, further comprising:

a black matrix on the scattering layer, the black matrix overlapping the reflective plate.

30. The method according to claim 28, wherein the scattering layer includes a spherical particle.

31. The method according to claim 30, wherein the step of forming the scattering layer comprises:

coating the polymer matrix including the spherical particle; and hardening the coated polymer matrix.

32. The method according to claim 30, wherein the step of forming the scattering layer comprises:

coating the polymer matrix;

dispersing the spherical particle into the coated polymer matrix; and hardening the polymer matrix where the spherical particle is dispersed.

33. A liquid crystal display device, comprising:

first and second substrates facing and spaced apart from each other;

a gate line and a data line on an inner surface of the first substrate, the gate line and the data line crossing each other and defining a pixel region;

a thin film transistor connected to the gate line and the data line, the thin film transistor having a gate electrode, an active layer, and source and drain electrodes;

a passivation layer covering the gate line, the data line and the thin film transistor;

a reflective plate of an opaque material on the passivation layer at the pixel region, the reflective plate having a transmissive portion;

a scattering layer on the reflective plate, the scattering layer having a contact hole exposing the drain electrode through the passivation layer; and a pixel electrode of a transparent conductive material on the scattering layer and the passivation layer at the pixel region, the pixel electrode being connected to the drain electrode through the contact hole.

34. The device of claim 33, wherein the transmissive portion includes a hole.

35. The device of claim 34, wherein a portion of the pixel electrode is formed in the hole below the reflective plate.

36. The device of claim 35, wherein the transmissive portion is formed by etching a portion of the passivation layer and the scattering layer corresponding to the transmissive portion.

* * * * *